(12) United States Patent
Yeom

(10) Patent No.: US 11,322,946 B2
(45) Date of Patent: May 3, 2022

(54) BATTERY PACK, METHOD FOR CONTROLLING CHARGING OF BATTERY PACK, AND VEHICLE COMPRISING BATTERY PACK

(71) Applicant: Samsung SDI Co., Ltd., Yongin-si (KR)

(72) Inventor: Gilchoun Yeom, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 65 days.

(21) Appl. No.: 16/080,631

(22) PCT Filed: Nov. 6, 2017

(86) PCT No.: PCT/KR2017/012475
§ 371 (c)(1),
(2) Date: Aug. 28, 2018

(87) PCT Pub. No.: WO2018/139742
PCT Pub. Date: Aug. 2, 2018

(65) Prior Publication Data
US 2019/0067957 A1    Feb. 28, 2019

(30) Foreign Application Priority Data
Jan. 24, 2017 (KR) .................. 10-2017-0011180

(51) Int. Cl.
*H02J 7/00* (2006.01)
*H01M 10/44* (2006.01)
(Continued)

(52) U.S. Cl.
CPC ......... *H02J 7/0013* (2013.01); *H01M 10/425* (2013.01); *H01M 10/441* (2013.01);
(Continued)

(58) Field of Classification Search
CPC ...... H02J 7/0013; H02J 7/0004; H02J 7/0029; H02J 2007/0098; H02J 7/0045;
(Continued)

(56) References Cited

U.S. PATENT DOCUMENTS

2004/0109274 A1* 6/2004 Sato .................. H02J 7/0031
361/90
2005/0077878 A1* 4/2005 Carrier .................. H01M 50/20
320/134
(Continued)

FOREIGN PATENT DOCUMENTS

CN    102315665 A    1/2012
CN    102859784 A    1/2013
(Continued)

OTHER PUBLICATIONS

Extended European Search Report for corresponding European Patent Application No. 17893849.4, dated May 28, 2020, 10 pages.
(Continued)

*Primary Examiner* — Richard Isla
*Assistant Examiner* — Mohammed J Sharief
(74) *Attorney, Agent, or Firm* — Lewis Roca Rothgerber Christie LLP

(57) ABSTRACT

Disclosed is a battery pack, including: at least one battery module which includes a plurality of battery cells and is connected between a first terminal and a second terminal; a relay connected between the first terminal and a third terminal; and a battery management system (BMS) which is connected to the first to third terminals, and generates a charge control signal controlling a charge operation of a charger connected to the third terminal based on battery detection information obtained by detecting the plurality of battery cells and the at least one battery module.

16 Claims, 4 Drawing Sheets

(51) Int. Cl.
*H01M 10/42* (2006.01)
*H01M 10/48* (2006.01)

(52) U.S. Cl.
CPC ......... *H01M 10/482* (2013.01); *H02J 7/0029* (2013.01); *H02J 7/00036* (2020.01); *H01M 10/4257* (2013.01); *H01M 2010/4271* (2013.01); *H01M 2010/4278* (2013.01); *H01M 2220/20* (2013.01)

(58) Field of Classification Search
CPC .... H02J 2207/40; H02J 7/0024; H02J 7/0026; H01M 10/425; H01M 10/441; H01M 10/482; H01M 2010/4271; H01M 2010/4278; H01M 2220/20
USPC .......................................................... 320/111
See application file for complete search history.

(56) References Cited

U.S. PATENT DOCUMENTS

| | | | |
|---|---|---|---|
| 2005/0134230 A1* | 6/2005 | Sato ................... | H01M 10/486 320/136 |
| 2012/0007547 A1 | 1/2012 | Kim | |
| 2012/0139479 A1* | 6/2012 | Yun ........................ | H02J 7/00 320/107 |
| 2012/0206111 A1* | 8/2012 | Park ..................... | H02J 7/0029 320/163 |
| 2012/0286575 A1 | 11/2012 | Park et al. | |
| 2013/0044002 A1* | 2/2013 | Schneider ............ | H02J 7/0021 340/636.2 |
| 2013/0069425 A1* | 3/2013 | Kanazawa ........... | H01M 10/48 307/9.1 |
| 2013/0069594 A1 | 3/2013 | Jung | |
| 2013/0234508 A1* | 9/2013 | Eisele ................... | B60L 50/51 307/9.1 |
| 2013/0249277 A1 | 9/2013 | Park et al. | |
| 2015/0035475 A1* | 2/2015 | Li ....................... | H02J 7/00047 320/107 |
| 2015/0035495 A1* | 2/2015 | Yoshida ............... | G01R 31/382 320/134 |
| 2015/0352967 A1* | 12/2015 | Timpf, Jr. ............. | B60L 53/14 320/109 |
| 2016/0325626 A1* | 11/2016 | Honda ...................... | H02J 7/02 |
| 2016/0344206 A1* | 11/2016 | Ono ...................... | H02J 7/0031 |
| 2017/0163064 A1 | 6/2017 | Liu et al. | |
| 2017/0259956 A1* | 9/2017 | Hori ........................ | F25B 21/04 |
| 2018/0062150 A1* | 3/2018 | Kim ................... | H01M 10/425 |
| 2018/0069274 A1* | 3/2018 | Matsubara ............ | B60L 58/14 |

FOREIGN PATENT DOCUMENTS

| | | |
|---|---|---|
| CN | 103187773 A | 7/2013 |
| CN | 105024411 A | 11/2015 |
| CN | 105270195 A | 1/2016 |
| CN | 105515094 A | 4/2016 |
| EP | 2 579 382 A2 | 4/2013 |
| JP | 2010-81704 A | 4/2010 |
| JP | 2014-506105 A | 3/2014 |
| KR | 10-2010-0065557 A | 6/2010 |
| KR | 10-2011-0132977 A | 12/2011 |
| KR | 10-2012-0015895 A | 2/2012 |
| KR | 10-1182890 B1 | 9/2012 |
| KR | 10-2013-0078954 A | 7/2013 |
| KR | 10-2013-0107995 A | 10/2013 |

OTHER PUBLICATIONS

Chinese First Office action dated Dec. 30, 2020 issued in corresponding Chinese Application No. 201780022323.2, with translation, 28 pages.
Chinese Office Action, with English translation, dated Aug. 4, 2021, issued in corresponding Chinese Patent Application No. 201780022323.2 (7 pages).
Korean Notice of Allowance dated Oct. 22, 2021 issued in corresponding KR Application No. 10-2017-0011180, 2 pages.
CN Third Office action dated Jan. 19, 2022 issued in corresponding CN Application No. 201780022323.2, with English translation, 30 pages.

* cited by examiner

BATTERY PACK, METHOD FOR CONTROLLING CHARGING OF BATTERY PACK, AND VEHICLE COMPRISING BATTERY PACK

CROSS-REFERENCE TO RELATED APPLICATION(S)

This application is a National Phase Patent Application of International Patent Application Number PCT/KR2017/012475, filed on Nov. 6, 2017, which claims priority of Korean Patent Application No. 10-2017-0011180, filed Jan. 24, 2017. The entire contents of both of which are incorporated herein by reference.

TECHNICAL FIELD

The present disclosure relates to a battery pack, a method of controlling charge of the battery pack, and a vehicle including the battery pack.

BACKGROUND ART

In general, a charger for charging a battery pack measures a voltage of a battery pack before supplying charging power to the battery pack. When the voltage of the battery pack is measured, the charger turns on a power switch for supplying power to the battery pack. When the voltage of the battery pack is not measured, the charger maintains the power switch in an off state.

To this end, the battery pack always needs to be powered on. When the battery pack is in a power-on state, a battery management system (BMS) included in the battery pack always needs to be powered on.

Then, self-discharge of the battery pack is always generated, so that unnecessary discharge is generated from the battery pack. When such a situation is maintained for a long time, self-discharge through the BMS is generated, so that the battery pack may be lost.

Further, when the charger detects a state of the battery pack, a measurement error is generated due to a cable connected between the battery pack and the charger so that there may be a problem in that charging efficiency is degraded.

DISCLOSURE

Technical Problem

The present invention has been made in an effort to provide a battery pack, which is capable of preventing a battery pack from being lost due to self-discharge of a battery management system (BMS) and improving charging efficiency, a method of controlling charge of the battery pack, and a vehicle including the battery pack.

Technical Solution

An exemplary embodiment of the present invention provides a battery pack, including: at least one battery module which includes a plurality of battery cells and is connected between a first terminal and a second terminal; a relay connected between the first terminal and a third terminal; and a battery management system (BMS) which is connected to the first to third terminals, and generates a charge control signal controlling a charge operation of a charger connected to the third terminal based on battery detection information obtained by detecting the plurality of battery cells and the at least one battery module.

The BMS may generate a charge control signal directing any one of pre-charge and normal charge based on the battery detection information, and a current supplied from the charger in the normal charge may be higher than a current supplied through the charger in the pre-charge.

When charge power starts to be supplied from the charger, a state of the BMS may be changed from a shut-down state to a wake-up state and the BMS is on.

The BMS may communicate with an external device through a controller area network (CAN) bus, and the CAN bus may be on in the wake-up state.

When the BMS receives an internal lock on signal corresponding to a signal instructing a stop of an operation of a vehicle including the battery pack in the wake-up state, the BMS may control the charge operation of the charger based on the battery detection information.

When the BMS receives the internal lock on signal, the BMS may switch the relay to be on.

When the BMS detects any one of full-charge and a defect of the at least one battery module based on the battery detection information, the BMS may change the charge control signal and stop the charge operation of the charger.

When the BMS detects the full-charge of the at least one battery module and then detects that a current flowing in the battery pack is equal to or smaller than a predetermined threshold current for a predetermined threshold period of time, the BMS may be shut down.

The BMS may detect a defect of the at least one battery module, and then may be shut-down after a predetermined period of time.

A method of controlling charge of a battery pack according to another exemplary embodiment of the present invention may be applied to a battery pack, which includes at least one battery module including a plurality of cells and a battery management system (BMS), and supplies power to a vehicle. The method of controlling the charge of the battery pack includes: making the BMS be woken up by power supplied from a charger in a shut-down state of the BMS; in the wake-up state, receiving, by the BMS, an internal lock on signal corresponding to a signal directing a stop of an operation of the vehicle from a controller of the vehicle; and controlling, by the BMS, a charge operation of the charger based on battery detection information obtained by detecting the plurality of battery cells and the at least one battery module after receiving the internal lock on signal.

The controlling of the charge operation of the charger may include generating, by the BMS, a charge control signal directing any one of pre-charge and normal charge based on the battery detection information, and a current supplied from the charger in the normal charge may be higher than a current supplied through the charger in the pre-charge.

The controlling of the charge operation of the charger may include: determining, by the BMS, whether the at least one battery module is fully charged based on the battery detection information; and stopping, by the BMS, the charge operation of the charger when the at least one battery module is fully charged.

The method may further include when a current flowing in the battery pack is equal to or smaller than a predetermined threshold current for a predetermined threshold period of time after the full-charge of the at least one battery module, making the BMS be shut down.

The controlling of the charge operation of the charger may include: determining, by the BMS, whether the at least one battery module has a defect based on the battery detection information; and stopping, by the BMS, the charge operation of the charger when the at least one battery module has the defect.

The method may further include making the BMS be shut down after a predetermined period of time elapses from the determination of the defect of the at least one battery module.

Still another exemplary embodiment of the present invention provides a vehicle, including: a battery pack which includes at least one battery module including a plurality of battery cells and a battery management system (BMS) generating a charge control signal based on battery detection information obtained by detecting the plurality of battery cells and the at least one battery module; a charger which supplies charge power to the battery pack according to the charge control signal; and a controller which outputs an internal lock on signal to the BMS when receiving an internal lock signal from the charger after the charger is turned on.

The BMS may be woken up by power supplied from the charger, and when the BMS receives the internal lock on signal in the wake-up state within a predetermined period of time, the BMS may generate a charge control signal controlling a charge operation of the charger based on the detection information.

The BMS may generate a charge control signal directing any one of pre-charge and normal charge based on the battery detection information, and the charger may supply a current higher than a current supplied in the pre-charge to the battery pack during the normal charge.

The BMS may detect any one of full-charge and a defect of the at least one battery module based on the battery detection information, and when the at least one battery module is fully charged or has the defect, the BMS may generate a charge control signal instructing a stop of the charge operation of the charger.

The BMS may be woken up by power supplied from the charger, and when the BMS receives the internal lock on signal in the wake-up state within a predetermined period of time, the BMS may notify the charger whether the battery pack is chargeable based on the battery detection information.

Advantageous Effects

According to the exemplary embodiments of the present invention, it is possible to provide the battery pack, which is capable of preventing a battery pack from being lost due to self-discharge of a battery management system (BMS) and improving charging efficiency, the method of controlling charge of the battery pack, and the vehicle including the battery pack.

MODE FOR INVENTION

Figure 1:
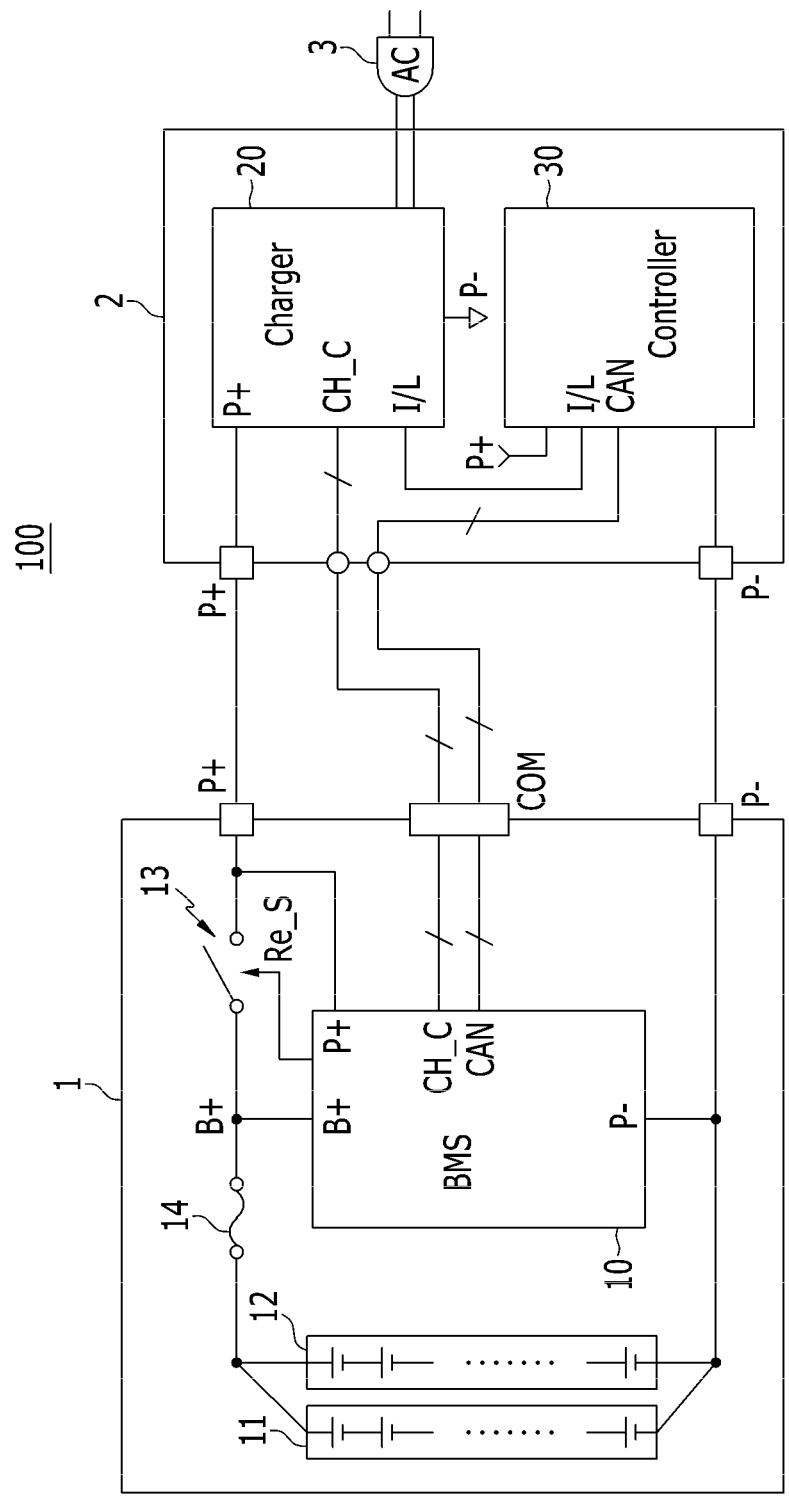
FIG. 1 is a diagram illustrating a battery pack according to an exemplary embodiment and a configuration of a part of a vehicle including the battery pack.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. Unless explicitly described to the contrary, the word "comprise" and variations such as "comprises" or "comprising", will be understood to imply the inclusion of stated elements but not the exclusion of any other elements.

FIG. 1 is a diagram illustrating a battery pack according to an exemplary embodiment and a configuration of a part of a vehicle including the battery pack.

As illustrated in FIG. 1, a vehicle 100 according to an exemplary embodiment includes a battery pack 1 and other configurations 2 of a vehicle, which are electrically connected with the battery pack. In FIG. 1, the configurations 2 include a charger 20 and a controller 30. The configurations 2 illustrated in FIG. 1 are illustrated to include only partial configurations, which are electrically connected with a battery management system (BMS) 10 for convenience of the description, but the present invention is not limited thereto.

The battery pack 1 includes the BMS 10, two battery modules 11 and 12, a relay 13, and a fuse 14. FIG. 1 illustrates that the battery pack 1 includes the two battery modules 11 and 12, but this is simply illustrative for the description, and the present invention is not limited thereto. Further, it is illustrated that the vehicle 100 includes the charger 20, but the charger 20 may be implemented as a separate configuration from the vehicle 100.

The battery pack 1 supplies power to the vehicle 100. Each of the two battery modules 11 and 12 includes a plurality of battery cells, and is connected between a P+ terminal and a P− terminal in parallel. Each of the two battery modules 11 and 12 may detect information (for example, a cell voltage and a cell temperature) about the plurality of cells, and information (for example, a current flowing in the battery module, a voltage of the battery module, and a temperature of the battery module) about the battery module and transmit the detected information to the BMS 10. Hereinafter, the information about the plurality of cell and the information about the battery module are referred to as battery detection information.

The fuse 14 may be connected between the two battery modules 11 and 12 and a B+ terminal and be opened when an overcurrent flows.

The relay 13 is connected between the B+ terminal and the P+ terminal, and is operated under the control of the BMS 10. For example, the relay 13 is switched according to a relay signal Re_S output from the BMS 10. When a charging operation starts and power is supplied from the charger 20, the BMS 10 may generate the relay signal Re_S, which turns on the relay 13.

The BMS 10 may receive the battery detection information from each of the two battery modules 11 and 12, transmit the battery detection information through communication with the charger 20 and the controller 30 of the vehicle 100, and receive information required for management of the battery from the charger 20 and the controller 30.

For example, the communication scheme between the BMS 10 and the controller 30 may be controller area network (CAN) communication.

The battery pack 1 may include a COM port, and the COM port may include a plurality of terminals for the CAN communication, and a plurality of terminals for the communication with the BMS 10 and the charger 20. The P+ terminal of the battery pack 1 is connected with a P+ terminal of the vehicle 100, and the P− terminal of the battery pack 1 is connected with a P− terminal of the vehicle 100.

When the charger 20 is turned on, a state of the BMS 10 is changed from a shut-down state to a wake-up state, and when the controller 30 becomes an internal lock state, the BMS 10 may generate the charge control signal CH_C controlling an operation of the charger 20 based on the battery detection information received from each of the two battery modules 11 and 12.

The BMS 10 may detect the states of the battery modules 11 and 12 based on the battery detection information, notify the charger 20 that the battery modules 11 and 12 are in the chargeable state, and generate the charge control signal CH_C according to the charging state. The charge control signal CH_C is a pulse width modulation signal, and the BMS 10 adjusts an on-duty ratio of the charge control signal CH_C according to the charging state.

For example, when both the battery modules 11 and 12 are in the full-charge state, the BMS 10 may generate the charge control signal CH_C of the on-duty ratio of 0% directing full-charge.

In the charge start states of the battery modules 11 and 12, the BMS 10 may generate the charge control signal CH_C of the on-duty ratio of 12% directing pre-charge. The pre-charge means that the battery pack 1 is charged with a predetermined first current according to a constant current (CC) mode. The charge start state is a state, in which a minimum cell voltage at a charge start point is equal to or smaller than a predetermined first voltage, and when the minimum cell voltage reaches a predetermined second voltage after the charge start, the charge start state is terminated.

After the charge start state is terminated, the BMS 10 may generate the charge control signal CH_C of the on-duty ratio of 38% directing normal charge. The normal charge discriminated from the pre-charge means that the battery pack 1 is charged with a predetermined second current according to the CC mode, and the second current has a higher level than that of the first current. The normal charge may further include a case where the battery pack 1 is charged with a predetermined voltage according to a constant voltage (CV) mode.

The charger 20 may control a current supplied to the battery pack 1 according to the on-duty ratio of the charge control signal CH_C.

The pre-charge may also be applied in the state where a temperature of each of the battery modules 11 and 12 deviates from a predetermined normal temperature range, as well as the charge start state. The BMS 10 may generate the charge control signal CH_C directing the pre-charge in the state where the temperature of each of the battery modules 11 and 12 deviates from the normal temperature range. The BMS 10 may generate the charge control signal CH_C of the on-duty ratio directing the normal charge in the state where the temperature of each of the battery modules 11 and 12 is within the normal temperature range.

The BMS 10 may detect defects of the battery modules 11 and 12 based on the battery detection information. The defects of the battery modules 11 and 12 include various states, such as the state where there is a cell having an overvoltage or a low voltage among the cells included in the battery modules 11 and 12, the state where the battery modules 11 and 12 are in an over-temperature state or a low-temperature state, the state where an overcurrent flows in the battery pack 1, and the state where there is an over-discharged cell among the cells included in the battery modules 11 and 12, in which the battery 1 cannot be normally operated. When the BMS 10 detects the defects of the battery modules 11 and 12, the BMS 10 may transmit the detected defects to the charger 20 and make the charge operation be stop. In this case, in order to notify the defect, the BMS 10 may generate the charge control signal CH_C of the on-duty ratio of 100%, and generate the relay signal Re-S turning off the relay 13.

When a plug 3 is connected to a plug socket, to which external power is supplied, the charger 20 is plugged in and the charger 20 is turned on. When the charger 20 is turned on, power is supplied to the BMS 10 and the controller 30 through the P+ terminal of the charger 20 for a predetermined period of time, and an internal lock signal I/L is transmitted to the controller 30. When the charger 20 receives the information indicating that the battery pack 1 is in the chargeable state from the BMS 10, the charger 20 supplies charging power to the battery pack 1 according to the charge control signal CH_C.

The controller 30 is the configuration controlling all of the operations of the vehicle, and may control an operation of the vehicle 100 in consideration of information about the battery pack 1 received from the BMS 10. The information about the battery pack 1 includes the battery detection information. The controller 30 and the BMS 10 may mutually transceive required information required through the CAN communication.

When the charger 20 is turned on, the state of the controller 30 is changed from the shut-down state to the wake-up state, and when the controller 30 receives the internal lock signal I/L, the controller 30 transmits an output corresponding to the internal lock signal I/L to the BMS 10. The controller 30 stops the operation of the vehicle 100 according to the internal lock signal I/L.

Figure 2:
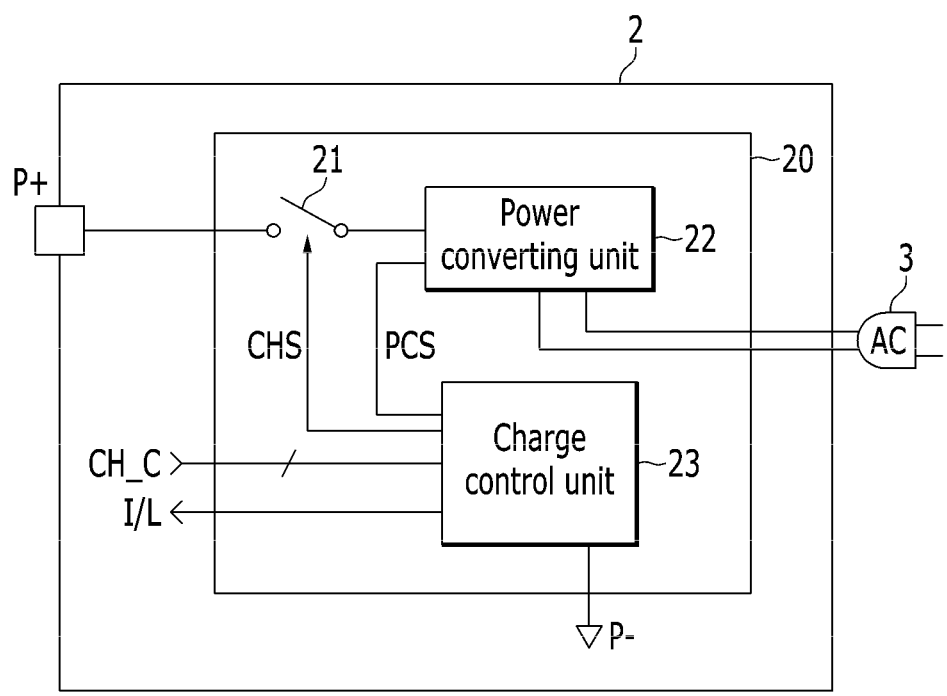
FIG. 2 is a diagram illustrating a configuration of a charger according to the exemplary embodiment.

FIG. 2 is a diagram illustrating a configuration of a charger according to the exemplary embodiment.

As illustrated in FIG. 2, the charger 20 includes a power transfer switch 21, a power converting unit 22, a charge control unit 23.

The power transfer switch 21 is switched according to a charge signal CHS received from the charge control unit 23. When the charger 20 is turned on, the power transfer switch 21 may be turned on.

The power converting unit 22 receives external power, converts the external power according to a power control signal PCS, and generates output power. The output power is supplied to the battery pack 10 and the controller 30 through the P+ terminal while the power transfer switch 21 is on.

When the charger 20 is plugged in, the charge control unit 23 turns on the power transfer switch 21, generates the power control signal PCS, and supplies power to the BMS 10 and the controller 30 for a predetermined period of time. The charge control unit 23 turns on the power transfer switch 21, and then outputs an internal lock signal I/L. When the charge control unit 23 receives a signal indicating that the battery pack is in a charge available state from the BMS 10 within a predetermined period of time, the charge control unit 23 generates the power control signal PCS according to the charge control signal CH_C received from the BMS 10 and controls an operation of the power converting unit 22.

In the exemplary embodiment, the BMS 10 may notify the charge control unit 23 that the battery pack is in the charge available state by using the charge control signal CH_C. The present invention is not limited thereto, and the BMS 10 may generate another signal, other than the charge control signal CH_C, and transmit the generated signal to the charge control unit 23.

Hereinafter, operations of the BMS 10, the charger 20, and the controller 30 according to the exemplary embodiment will be described with reference to FIGS. 3 and 4.

Figure 3:
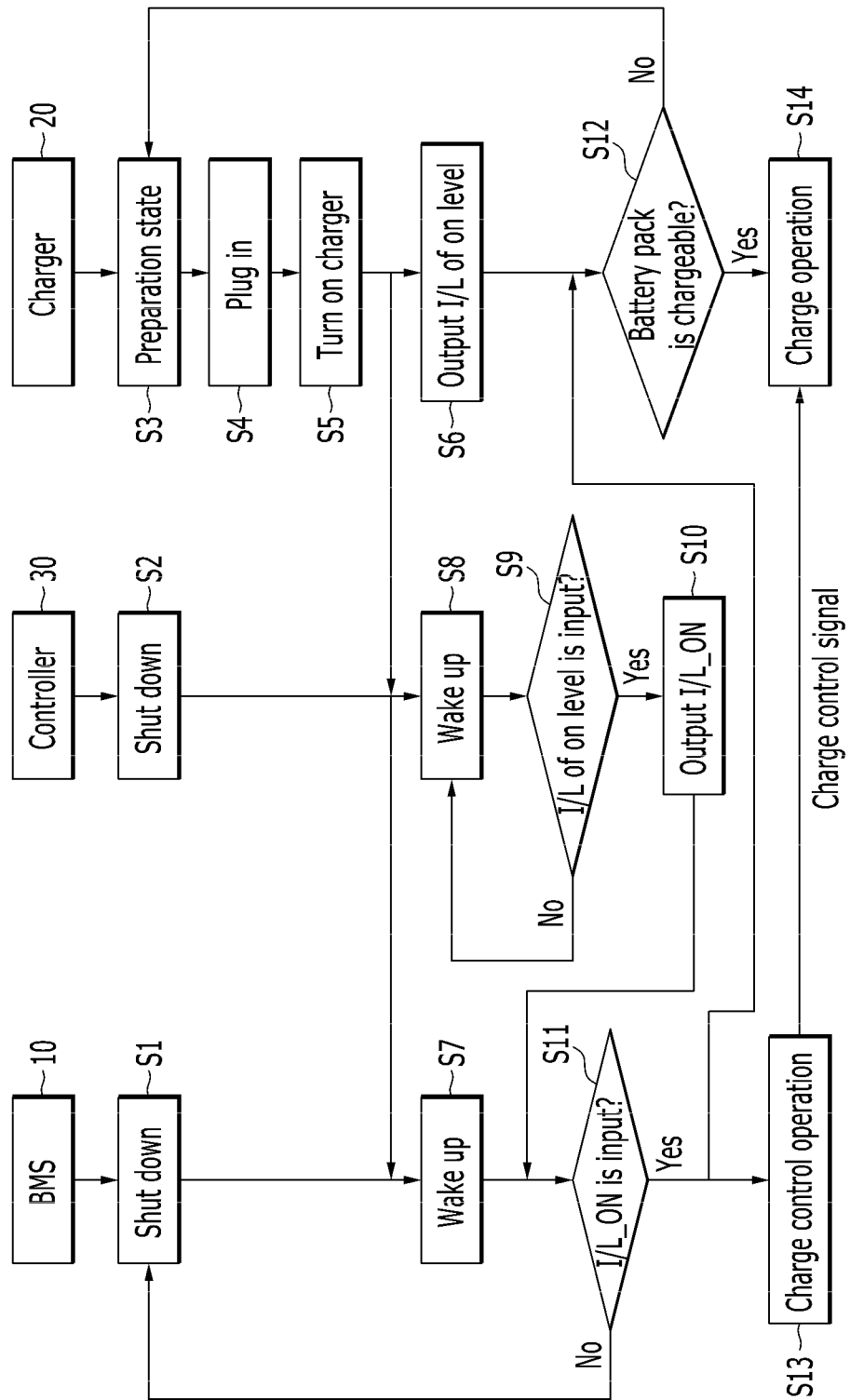
FIGS. 3 and 4 are flowcharts illustrating operations of a battery management system (BMS), a charger, and a controller.
Figure 4:
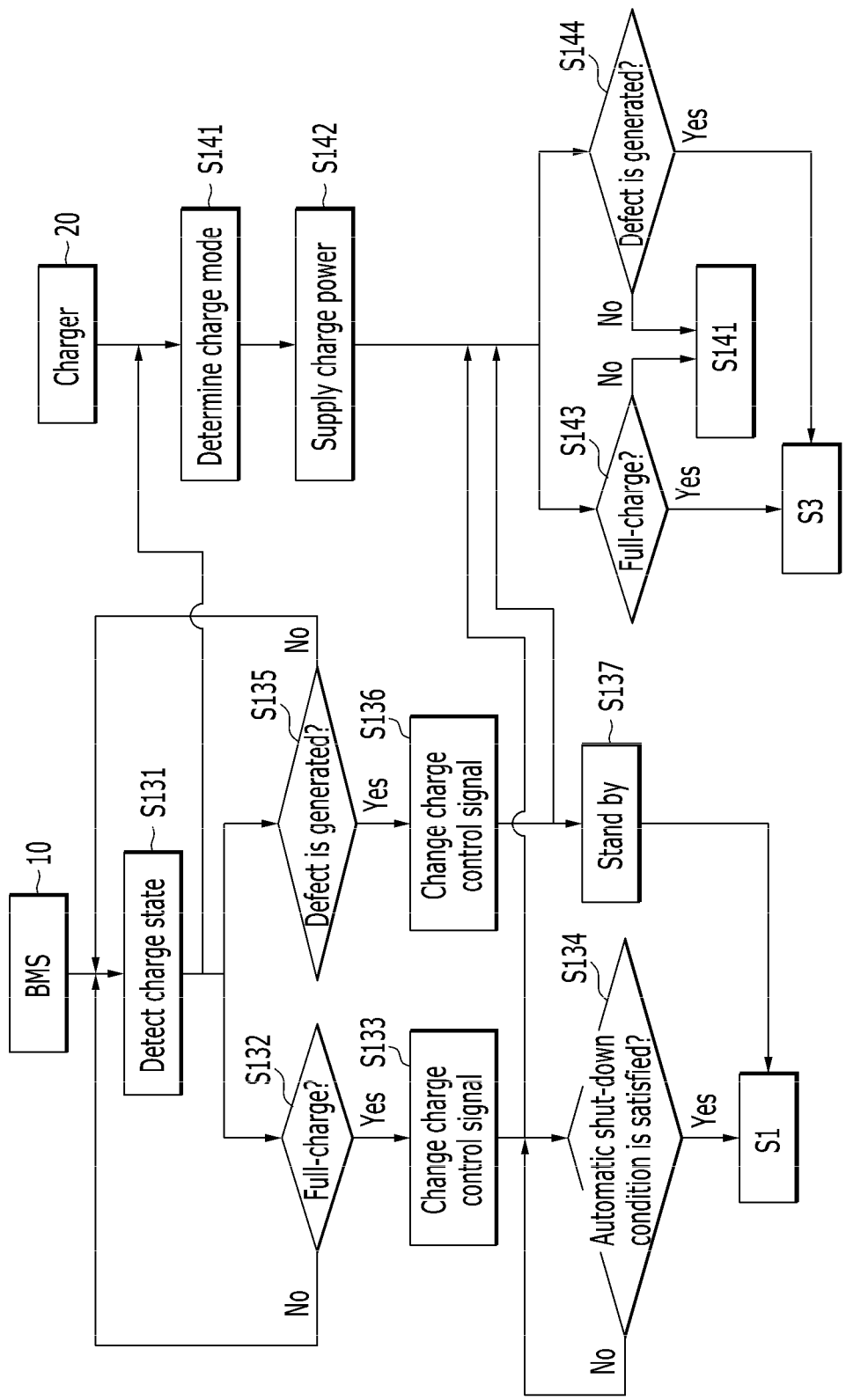

FIGS. 3 and 4 are flowcharts illustrating operations of the BMS, the charger, and the controller.

As illustrated in FIG. 3, when the BMS 10 and the controller 30 according to the exemplary embodiment are not operated, the BMS 10 and the controller 30 are maintained in a shut-down state (S1 and S2). In the shut-down state, the BMS 10 controls the relay 13 to be off and the controller 30 also controls the entire vehicle 100 to be off.

The charger 20 is maintained in a preparation state (S3), and there is no power supplied from the charger 20. The charger 20 is plugged in (S4), and the charger 20 is turned on (S5). The charger 20 is turned on, so that the power is supplied to the BMS 10 and the controller 30 from the charger 20 for a predetermined period of time. After the charger 20 is turned on, the charger 20 outputs an internal lock signal I/L of an on-level (S6).

Then, the BMS 10 and the controller 30 are woken up (S7 and S8). In the wake-up state, the BMS 10 and the controller 30 are turned on by the power supplied from the charger 20, and the communication function is also on. For example, a communication scheme between the BMS 10 and the controller 30 is a controller area network (CAN) communication scheme, and a CAN bus of the BMS 10 and a CAN bus of the controller 30 may be turned on. Even in the wake-up state of the BMS 10, the relay 13 is in an off state.

The controller 30 determines whether the internal lock signal I/L of the on-level is received after the wake-up (S9). As a result of the determination of operation S9, when the internal lock signal I/L of the on-level is received, the controller 30 outputs an internal lock on signal I/L_ON indicating that the internal lock signal I/L of the on-level has been received to the BMS 10 (S10).

After the BMS 10 is woken up, the BMS 10 determines whether the internal lock on signal I/L ON is input from the controller 30 within the predetermined period of time (S11). As a result of the determination of operation S11, when the internal lock on signal I/L ON is input within the predetermined period of time, the BMS 10 transmits information indicating whether the battery pack is chargeable to the charger 20 based on battery detection information. The BMS 10 performs a charge control operation based on the battery detection information (S13). The BMS 10 may adjust an on-duty ratio of the charge control signal CH_C during the charge control operation.

The charger 20 determines whether the battery pack 1 is in the chargeable state (S12). As described above, the BMS 10 may notify whether the battery pack is chargeable by using the charge control signal CH_C. As a result of the determination of operation S12, when the battery pack 1 is in the chargeable state, the charger 20 performs a charge operation according to the charge control signal CH_C (S14). During the charge operation, the charger 20 may generate a power control signal PCS according to the charge control signal CH_C and control power supplied to the battery pack 1.

As illustrated in FIG. 4, in the charge control operation S13, the BMS 10 detects a charge state based on the battery detection information (S131). As a result of the detection of operation S131, the BMS 10 may adjust a charge control signal CH_C. For example, the BMS 10 may adjust the charge control signal CH_C to the charge control signal CH_C directing any one of pre-charge and normal charge based on the result of the detection of operation S131.

Further, based on the result of the detection of operation S131, the BMS 10 determines whether the battery modules 11 and 12 are fully charged or have defects (S132 and S135).

As a result of the determination of operation S132, when the battery modules 11 and 12 are fully charged, the BMS 10 changes the charge control signal CH_C to the charge control signal CH_C directing full-charge. For example, the BMS 10 changes the on-duty ratio of the charge control signal CH_C to 0%. As a result of the determination of operation S132, when the battery modules 11 and 12 are not fully charged, the BMS 10 maintains the charge operation. Then, the method repeats the operations from operation S131 again.

After operation S133, the BMS 10 determines whether an automatic shut-down condition is satisfied (S134). The automatic shut-down condition may be a condition, under which a current flowing in the battery pack 1 is maintained in a state of being equal to or smaller than a predetermined threshold current for a predetermined threshold period of time. As a result of the determination of operation S134, when the automatic shut-down condition is satisfied, the BMS 10 is shut down according to operation S1. As the result of the determination of operation S134, when the automatic shut-down condition is not satisfied, the charge control signal CH_C is maintained with the on-duty ratio directing the full-charge.

As a result of the determination of operation S135, when the battery modules 11 and 12 have defects, the BMS 10 changes the charge control signal CH_C to the charge control signal CH_C indicating the defect. For example, the BMS 10 changes the on-duty ratio of the charge control signal CH_C to 100%. As the result of the determination of operation S135, when the battery modules 11 and 12 do not have defects, the BMS 10 maintains the charge operation. Then, the method repeats the operations from operation S131 again.

After operation S136, the BMS 10 stands by for a predetermined period of time (S137). After operation S137, the BMS 10 is shut down according to operation S1.

As illustrated in FIG. 4, in the charging operation S14, the charger 20 determines a charge mode according to the charge control signal CH_C (S141). For example, in operation S141, any one of the pre-charge and the normal charge is determined according to the charge control signal CH_C. The charger 20 may select any one of a constant current (CC) mode and a constant voltage (CV) mode in the normal charge.

According to the charge mode determined in operation S141, the charger 20 may generate the power control signal PCS and supply charge power (S142).

As described above, the charge control signal CH_C may be changed by any one of operations S133 and S136. The charger 20 detects the charge control signal CHC_C and determines whether the battery modules are fully charged and have defects (S143 and S144).

As a result of the determination of operation S143, when the charge control signal CH_C directs the full-charge, the charger 20 stops the supply of the charge power and is in a preparation state according to operation S3. As the result of the determination of operation S143, when the charge control signal CH_C does not direct the full-charge, operation S141 is repeated again.

As the result of the determination of operation S144, when the charge control signal CH_C directs the defect, the charger 20 stops the supply of the charge power and is in the preparation state according to operation S3. As the result of the determination of operation S143, when the charge control signal CH_C does not direct the defect, operation S141 is repeated again.

Since the charger 20 needs to detect the charge control signal CH_C and determine a charge mode, operation S141 may be continuously performed.

According to the exemplary embodiment, it is possible to minimize a connection between the battery pack and the charger, thereby preventing power from being unnecessarily consumed. Further, according to the exemplary embodiment, the BMS used in the battery pack is not always powered on, so that it is possible to minimize unnecessary self-discharge incurable in the battery pack. Further, the BMS adjacent to the battery cell may control a charge mode of the charger, thereby more accurately and rapidly controlling charge power. Then, charge efficiency may be minimized and usability of the battery may be maximized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A battery pack, comprising:
    at least one battery module which includes a plurality of battery cells and is connected between a first terminal and a second terminal;
    a relay connected between the first terminal and a third terminal;
    a fuse connected between the first terminal and the at least one battery module; and
    a battery management system (BMS) which is directly connected to the first terminal, the second terminal, and the third terminal, and generates a charge control signal controlling a charge operation of a charger connected to the third terminal based on battery detection information obtained by detecting the plurality of battery cells and the at least one battery module,
    wherein the BMS is configured to:
    control the relay to be off in accordance with the BMS being in a shut-down state;
    change from the shut-down state to a wake-up state in response to power supplied from the charger with the relay remaining off;
    in response to receiving, from a controller, an internal lock on signal within a predetermined period of time:
        transmit information indicating that the battery pack is chargeable to the charger based on the battery detection information; and
        switch the relay to be on; and
    adjust an on-duty ratio of the charge control signal based on the battery detection information.

2. The battery pack of claim 1, wherein:
    the BMS generates the charge control signal directing any one of pre-charge and normal charge based on the battery detection information, and a current supplied from the charger in the normal charge is higher than a current supplied through the charger in the pre-charge.

3. The battery pack of claim 1, wherein:
    the BMS communicates with an external device through a controller area network (CAN) bus, and the CAN bus is on in the wake-up state.

4. The battery pack of claim 1, wherein:
    when the BMS receives the internal lock on signal corresponding to a signal instructing a stop of an operation of a vehicle including the battery pack in the wake-up state, the BMS controls the charge operation of the charger based on the battery detection information.

5. The battery pack of claim 1, wherein:
    when the BMS detects full-charge of the at least one battery module based on the battery detection information, the BMS changes the charge control signal and stops the charge operation of the charger.

6. The battery pack of claim 5, wherein:
    when the BMS detects the full-charge of the at least one battery module and then detects that a current flowing in the battery pack is equal to or smaller than a predetermined threshold current for a predetermined threshold period of time, the BMS is shut down.

7. The battery pack of claim 5, wherein:
    the BMS detects a defect of the at least one battery module, and then is shut-down after a predetermined period of time.

8. A method of controlling charge of a battery pack, which includes at least one battery module including a plurality of battery cells, a relay directly connected between a first terminal and a third terminal, a fuse connected between the first terminal and the at least one battery module, and a battery management system (BMS) directly connected to the first terminal and the third terminal, and supplies power to a vehicle, the method comprising:
    making the BMS be woken up by power supplied from a charger in a shut-down state of the BMS;
    in the wake-up state, receiving, by the BMS, an internal lock on signal corresponding to a signal directing a stop of an operation of the vehicle from a controller of the vehicle; and
    controlling, by the BMS, a charge operation of the charger based on battery detection information obtained by detecting the plurality of battery cells and the at least one battery module after receiving the internal lock on signal,
    wherein the controlling of the charge operation of the charger comprises:
    determining, by the BMS, whether the at least one battery module has a defect based on the battery detection information;
    stopping, by the BMS, the charge operation of the charger when the at least one battery module has the defect, the stopping comprising:
        generating, by the BMS, a charge control signal instructing a stop of a charge operation of the charger, the charge control signal having an on-duty ratio of 100%; and
        generating, by the BMS, a relay signal turning off the relay;
    placing the BMS in stand by for a predetermined period of time in response to stopping, by the BMS, the charge operation of the charger; and
    making the BMS shut down after the predetermined period of time elapses.

9. The method of claim 8, wherein:
    the controlling of the charge operation of the charger further includes generating, by the BMS, a charge control signal directing any one of pre-charge and normal charge based on the battery detection information, and a current supplied from the charger in the normal charge is higher than a current supplied through the charger in the pre-charge.

10. The method of claim 8, wherein:

the controlling of the charge operation of the charger further includes:

determining, by the BMS, whether the at least one battery module is fully charged based on the battery detection information; and stopping, by the BMS, the charge operation of the charger when the at least one battery module is fully charged.

11. The method of claim 10, further comprising:

when a current flowing in the battery pack is equal to or smaller than a predetermined threshold current for a predetermined threshold period of time after the full-charge of the at least one battery module, making the BMS be shut down.

12. A vehicle, comprising:

a battery pack which includes at least one battery module including a plurality of battery cells, a relay directly connected between a first terminal and a third terminal, a fuse connected between the first terminal and the at least one battery module, and a battery management system (BMS) directly connected to the first terminal and the third terminal and generating a charge control signal based on battery detection information obtained by detecting the plurality of battery cells and the at least one battery module;

a charger which supplies charge power to the battery pack according to the charge control signal; and a controller which outputs an internal lock on signal to the BMS when receiving an internal lock signal from the charger after the charger is turned on, the internal lock on signal corresponding to a signal instructing a stop of an operation of the vehicle including the battery pack, wherein the BMS is configured to:

control the relay to be off in accordance with the BMS being in a shut-down state;

change from the shut-down state to a wake-up state in response to power supplied from the charger with the relay remaining off;

in response to receiving, from the controller, the internal lock on signal within a predetermined period of time:

transmit information indicating that the battery pack is chargeable to the charger based on the battery detection information; and switch the relay to be on; and adjust an on-duty ratio of the charge control signal based on the battery detection information.

13. The vehicle of claim 12, wherein:

when the BMS receives the internal lock on signal in the wake-up state within the predetermined period of time, the BMS generates the charge control signal controlling the charge operation of the charger based on the detection information.

14. The vehicle of claim 12, wherein:

the BMS generates the charge control signal directing any one of pre-charge and normal charge based on the battery detection information, and the charger supplies a current higher than a current supplied in the pre-charge to the battery pack during the normal charge.

15. The vehicle of claim 12, wherein:

the BMS detects any one of full-charge and a defect of the at least one battery module based on the battery detection information, and when the at least one battery module is fully charged or has the defect, the BMS generates a charge control signal instructing a stop of a charge operation of the charger.

16. The vehicle of claim 12, wherein:

when the BMS receives the internal lock on signal in the wake-up state within the predetermined period of time, the BMS notifies the charger whether the battery pack is chargeable based on the battery detection information.

* * * * *